United States Patent
Schellhase et al.

(10) Patent No.: US 6,227,492 B1
(45) Date of Patent: May 8, 2001

(54) REDUNDANT ICE MANAGEMENT SYSTEM FOR AIRCRAFT

(75) Inventors: Ernst Calvin Schellhase, Ft. Worth; Mark P. Eisenhauer, Fort Worth; Richard Dean Miller, Keller; John Peter Pappas, Haltom City; Gary Scott Froman, Ft. Worth; Roger Jacques Michel Aubert, Arlington, all of TX (US)

(73) Assignee: Bell Helicopter TEXTRON Inc., Ft. Worth, TX (US)

( * ) Notice: Subject to any disclaimer, the term of this patent is extended or adjusted under 35 U.S.C. 154(b) by 0 days.

(21) Appl. No.: 09/369,726

(22) Filed: Aug. 6, 1999

(51) Int. Cl.[7] .................................................. B64D 15/00
(52) U.S. Cl. ...................................................... 244/134 D
(58) Field of Search ............................ 244/134 R, 134 A, 244/134 D; 416/974, 224; 219/548, 550, 528, 529

(56) References Cited

U.S. PATENT DOCUMENTS

| 1,705,126 | * | 3/1929 | Lee ................................. 244/134 D |
| 2,791,668 | * | 5/1957 | Cowdrey et al. ................. 244/134 D |
| 3,800,121 | | 3/1974 | Dean et al. .......................... 219/202 |
| 4,561,613 | | 12/1985 | Weisend, Jr. . |
| 5,074,497 | | 12/1991 | Phillips, II . |
| 5,351,918 | | 10/1994 | Giamati et al. . |
| 5,475,204 | | 12/1995 | Giamati et al. ....................... 219/548 |
| 5,947,418 | * | 9/1999 | Bessiere et al. ................. 244/134 D |

FOREIGN PATENT DOCUMENTS

| 0 749 894 A2 | 6/1996 | (EP) .............................. B64D/15/12 |
| 853799 | * 3/1940 | (FR) ................................. 244/134 D |
| 2 779 314 | 5/1998 | (FR) ................................. H05B/3/28 |
| 2319 943 | 11/1997 | (GB) ............................. B64D/15/12 |
| PCT/US98/19653 | 4/1999 | (WO) ............................. B64D/15/12 |

OTHER PUBLICATIONS

BFGoodrich Aerospace, "SMARTboot System".
BFGoodrich Aerospace, "Superlmide™ 800 Resin Composites".
BFGoodrich Aerospace, "Icing Wind Tunnel," 1994.
BFGoodrich, "Supplemental Air Heaters," 1994.
BFGoodrich, "Heated Drain Mast Products," 1994.
BFGoodrich, "Specialty Component Heated Products," 1994.
BFGoodrich, "Lavatory/Galley Water Heaters," 1994.
BFGoodrich, "Aerospace Composite Products," 1995.
BFGoodrich Aerospace, "Safety Advisory Aircraft Icing," 1996.
BFGoodrich Aerospace, "A Review of Products, Services and Capabilities," 1998.
BFGoodrich Aerospace, "Ice Protection Systems," 1998.

* cited by examiner

Primary Examiner—Galen L. Barefoot
(74) Attorney, Agent, or Firm—Gardere Wynne Sewell LLP; Sanford E. Warren, Jr.

(57) ABSTRACT

A redundant ice management system and method to de-ice and anti-ice an aircraft member (150) is provided. The system comprising a primary ice management sub-system (154) for providing thermal ice management to the aircraft member and a secondary ice management sub-system (172) for providing back-up thermal ice management to the aircraft member (150) in the event of a failure by the primary ice management sub-system (154). The system provides primary and secondary de-ice and anti-ice capabilities to the aircraft member (150) before and during airborne operation.

22 Claims, 6 Drawing Sheets

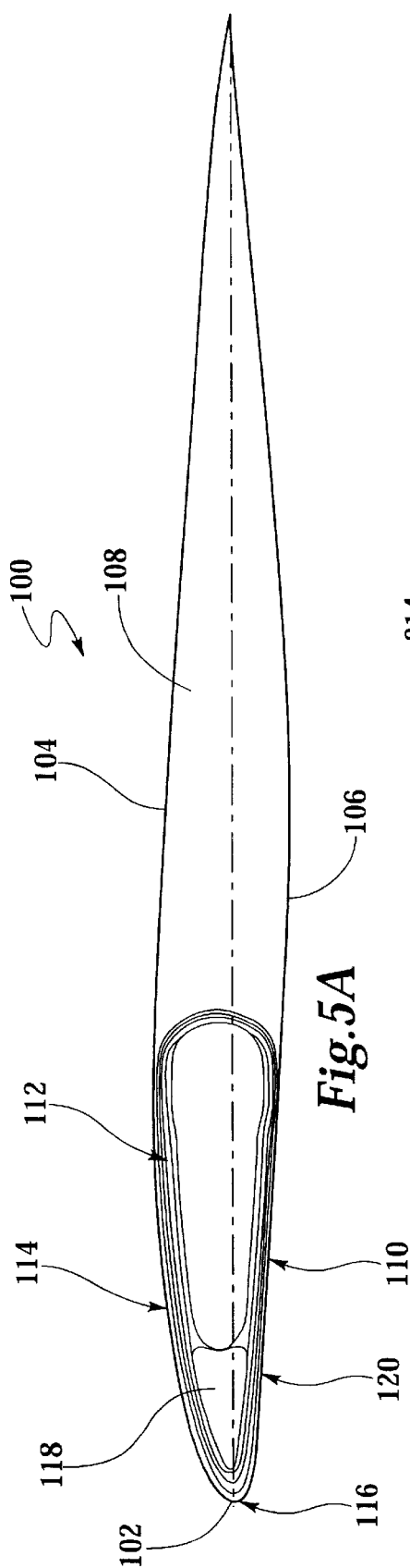
Fig.5A
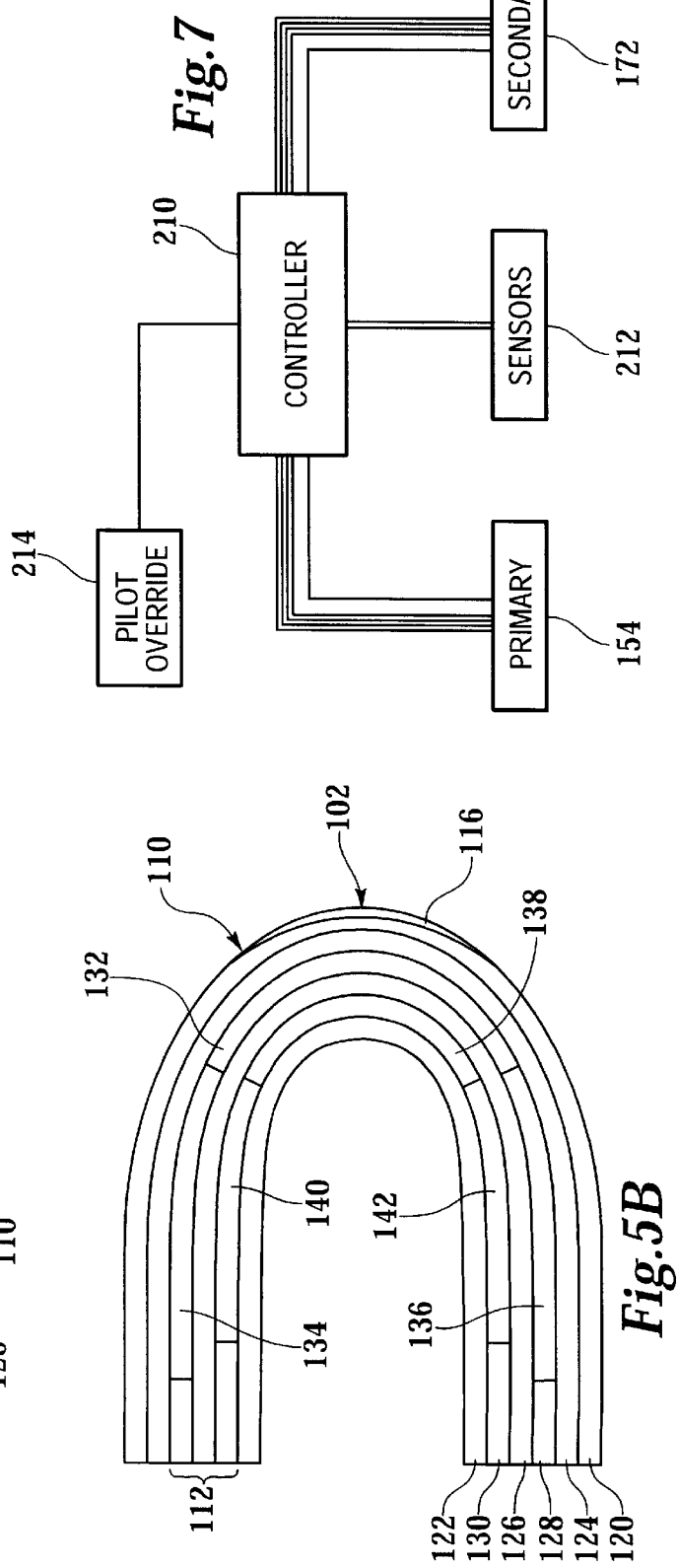
Fig.5B
Fig.7

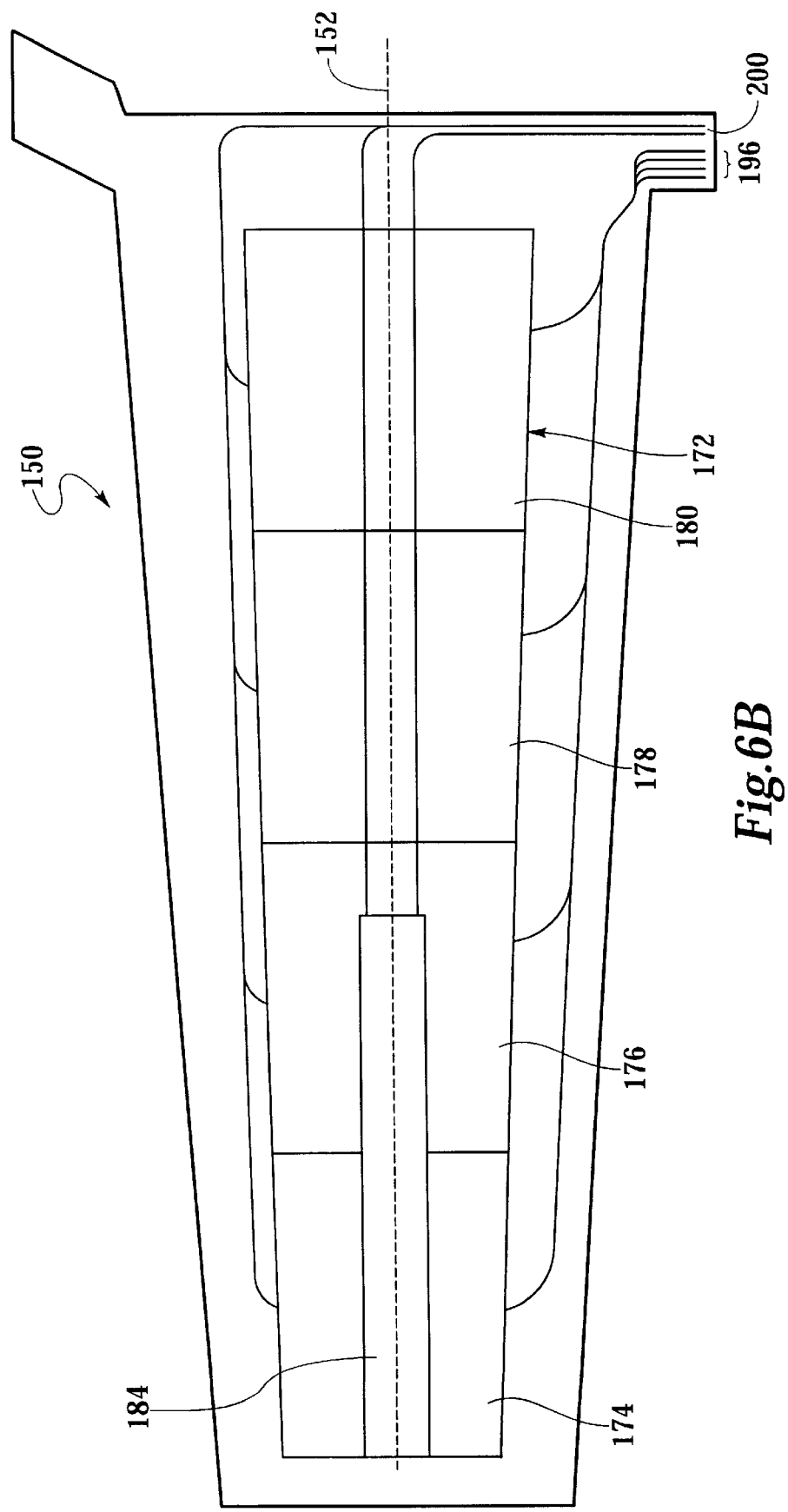

REDUNDANT ICE MANAGEMENT SYSTEM FOR AIRCRAFT

FIELD OF THE INVENTION

The present invention is related to electrical heating systems for the prevention or removal of ice accumulation on the surface of aircraft structural members and, more particularly, to a redundant ice management system for aircraft.

BACKGROUND OF THE INVENTION

The accumulation of ice on aircraft proprotors, wings and other structural members in flight is a well known danger during low temperature conditions. As used herein, the terms "aircraft members" or "structural members" are intended to refer to any aircraft surface susceptible to icing during flight, including proprotors, wings, stabilizers, engine inlets and the like. Attempts have been made since the earliest days of flight to overcome the problem of ice accumulation. While a variety of techniques have been proposed for removing ice from aircraft before or during flight, many prior systems or techniques experience various drawbacks or possess certain limitations.

One approach to ice management that has been used is so-called thermal de-icing. In thermal de-icing, the leading edges, that is, the portions of the aircraft that meet and break the airstream impinging on the aircraft, are heated to prevent the formation of ice or to loosen accumulated ice. The loosened ice is then blown from the structural members by the airstream passing over the aircraft.

In one form of thermal de-icing, heating is accomplished by placing an electrothermal pad, including heating elements, over the leading edges of the aircraft, or by incorporating the heating elements into the structural members of the aircraft. Electrical energy for each heating element is typically derived from a generating source driven by one or more of the aircraft engines or transmissions. The electrical energy is intermittently or continuously supplied to provide heat sufficient to prevent the formation of ice or to loosen accumulating ice.

With some commonly employed thermal de-icers, the heating elements are configured as ribbons, e.g. interconnected conductive segments, that are mounted on a flexible backing. The conductive segments are separated from each other by gaps, e.g. intersegmental gaps, and each ribbon is electrically energized by a pair of contact strips. When applied to a wing or other airfoil surface, the segments are arranged in strips or zones extending spanwise or chordwise of the aircraft wing, rotor or airfoil. One of these strips, known as a spanwise parting strip, is disposed along a spanwise axis which commonly coincides with a stagnation line that develops during flight in which icing is encountered. Other strips, known as chordwise parting strips, are disposed at the ends of the spanwise parting strip and are aligned along chordwise axes. Other zones, known as spanwise shedding zones, are typically positioned above and below the spanwise parting strip at a location intermediate the chordwise parting strips. Between adjacent zones, a gap, known as an interheater gap, sometimes exists.

One known method for de-icing causes electrical current to be transmitted continuously through parting strips so that the strips are heated continuously to a temperature above 32° F. In the spanwise shedding zones, on the other hand, current is transmitted intermittently so that the spanwise shedding zones are heated intermittently to a temperature above about 32° F.

While this technique of heating the various zones generally is effective to melt ice (or prevent its formation) without the consumption of excessive current, a problem exists in that melting of ice in the inter-segmental and interheater gaps can be difficult or impossible. Moreover melting of ice on or around the contact strips can also be difficult or impossible. Accumulation of ice in the gaps and on the contact stripe is particularly undesirable because the unmelted ice can serve as "anchors" for ice that would be melted but for the ice accumulated in the gaps or on the contact strips.

Another problem with prior thermal-based systems is their lack of reliability. Aircraft members, such as rotors of a helicopter or proprotors of tiltrotor aircraft, undergo much strain and stress associated with aircraft operation. Ongoing use of aircraft inevitably results in some damage to aircraft components. With respect to heating elements integrated within an aircraft member, breaks in blanket circuitry can cause thermal de-icing systems to fail, posing serious risk to aircraft crew and equipment during cold weather operations. And yet another concern with heating element circuitry is the potential for inconsistency, e.g. hot spot or cold spot generation, and larger than acceptable power consumption.

Problems may also be encountered where strips are run along the entire length of the aircraft. The size of the ice being shed by the aircraft member can cause a hazard to the aircraft's fuselage. If the particle of ice is too large, it could hit and may even penetrate the fuselage.

SUMMARY OF THE INVENTION

In response to the foregoing concerns, the present invention provides a new and improved thermal ice management system for aircraft structural members. Specifically, the present invention provides a secondary section having secondary anti-ice elements and secondary de-ice zones which provide thermal ice management to aircraft structural members.

The redundant ice management system of the present invention, includes a primary ice management sub-system that provides thermal ice management to aircraft structural members and a secondary ice management sub-system that provides back-up thermal ice management to aircraft structural members in the event of a failure by the primary ice management sub-system.

Further novel aspects of the present invention are found with the incorporation and use of separate zones within the primary and secondary sub-systems, integration of the redundant ice management systems with a controller and the integration of the controller with atmospheric, structural and system monitoring capabilities.

The present invention also provides a method for managing the formation of ice on aircraft structural members with an ice management system having primary and secondary ice management sub-systems that includes monitoring aircraft structural members and atmospheric conditions for ice formation on the aircraft's structural members, activating primary ice management systems in response to an indication of ice formation on the aircraft's structural members, monitoring the primary ice management systems to determine its operational readiness and efficiency and activating the secondary ice management system in response to monitoring of the primary ice management if the primary ice management system fails operational readiness and efficiency requirements.

One advantage of the present invention is that it provides for a backup ice management scheme in the event of a failure by the primary system. By providing primary and secondary sub-system elements, heat is effectively and efficiently generated throughout the aircraft member regardless of primary system failure. Sections of the primary and secondary sub-system elements are oriented spanwise and chordwise along the aircraft's structural member in a manner that can provide adequate surface coverage for thermal management operations.

Another advantage of the present invention is that it optimizes element dimensions, such that primary and secondary sub-system sections promote efficient heating along the entire targeted area and minimizes the amount of overlapping that is required to gain desired heat distribution for thermal ice management.

Yet another advantage of the present invention is that it eliminates cold spots which can arise on and around aircraft structural member through selective activation of heating elements disposed along a structural member.

Another advantage of the present invention is that it affords highly desirable levels of heating while using a minimum amount of power. More specifically, by sequentially heating spanwise shedding areas, power consumption is minimized by the controller without sacrificing de-icing capabilities. Additionally, flexible control of the primary and secondary elements maximizes de-icing capability. In particular, as flight conditions change, the interval during which each systems elements are heated can be varied by an onboard controller.

Another advantage of the invention is the stepwise employment of eight chordwise zones of de-icing in the spanwise direction from the rotor blade tip to root, rather than full span chordwise zones on the upper and lower rotor surfaces. Resulting ice pieces are therefore smaller and don't pose as great a risk in penetrating the aircraft's fuselage.

BRIEF DESCRIPTION OF THE DRAWINGS

For a more complete understanding of the present invention, including its features and advantages, reference is now made to the detailed description of the invention, taken in conjunction with the accompanying drawings of which:

FIG. 5 is cross-sectional view of a rotor blade of a helicopter or a proprotor of a tiltrotor aircraft present invention can be utilized;

FIGS. 6A–6B are top plan views of a schematic layout for the primary and secondary heating systems of the present invention; and FIG. 7 is a block diagram view of the system components for the present invention.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

The present invention is directed toward thermal control over the development of ice on aircraft structural members such as proprotors and wings. The invention involves incorporation of heater blanket technology as used in aircraft to remove ice from the leading edge of the aircrafts blade or proprotor. The blanket technology of the present invention includes separately controlled sub-systems, referred to as the primary heating system and the secondary heating system throughout this description. The purpose for having redundant systems is to provide a backup system for the aircraft and its crew if the primary system's heater elements fail. A secondary system allows continued operations with secondary de-ice or anti-ice management of an aircrafts blades and rotors.

Aircraft having thermal ice removal systems, may include an anti-ice zone that is heated so that ice is never allowed to forms and a de-ice zone wherein ice is allowed to form to a certain thickness and then is removed when heater elements are activated, bringing the surface temperature, through an abrasion strip, up to a point where the surface tension is reduced and the ice will fall away, be blown away by air flow over the aerodynamic surface or by the centrifugal force caused by rotor rotation.

Figure 1:
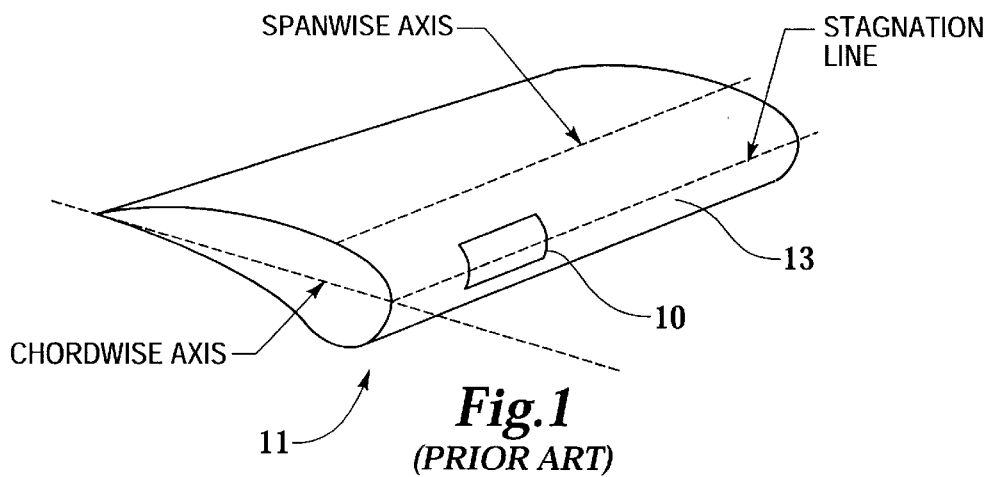
FIG. 1 is a partial perspective view of a prior art air foil having a thermal de-icer mounted along the airfoil's leading edge.

Referring to FIG. 1, a thermal de-icer 10 according to one implementation by the prior art is shown mounted on a structural member 11 in the form of a wing. As is known, the structural member 11 includes a chordwise axis and a slantwise axis. During flight, airflow impinges a leading edge 13 of the structural member 11, and a number of stagnation points develop, forming a stagnation line or axis, which stagnation line varies during flight conditions.

The de-icer 10 is mounted symmetrically about the stagnation line which would be most commonly encountered during icing conditions. Due to the sweep of the structural member 11 upon which the de-icer 10 is employed, a pair of chordwise disposed or side edges of the de-icer 10 have a chevron shape when the de-icer 10 is flat. As will be appreciated by those skilled in the art, configuring the side edges in this manner allows for two of de-icers 10 to be placed side-by-side, along the leading edge 13, without forming a gap between the two de-icers 10. For a structural member 11 with no sweep, the side edges would be perpendicular with the stagnation line when the de-icer 10 is flat. In the following discussion, the operation of a single de-icer 10 will be discussed. It should be recognized, nonetheless, that commonly a number of de-icers 10 would be mounted adjacent to one another along the leading edge 13 of the structural member 11.

Figure 2:
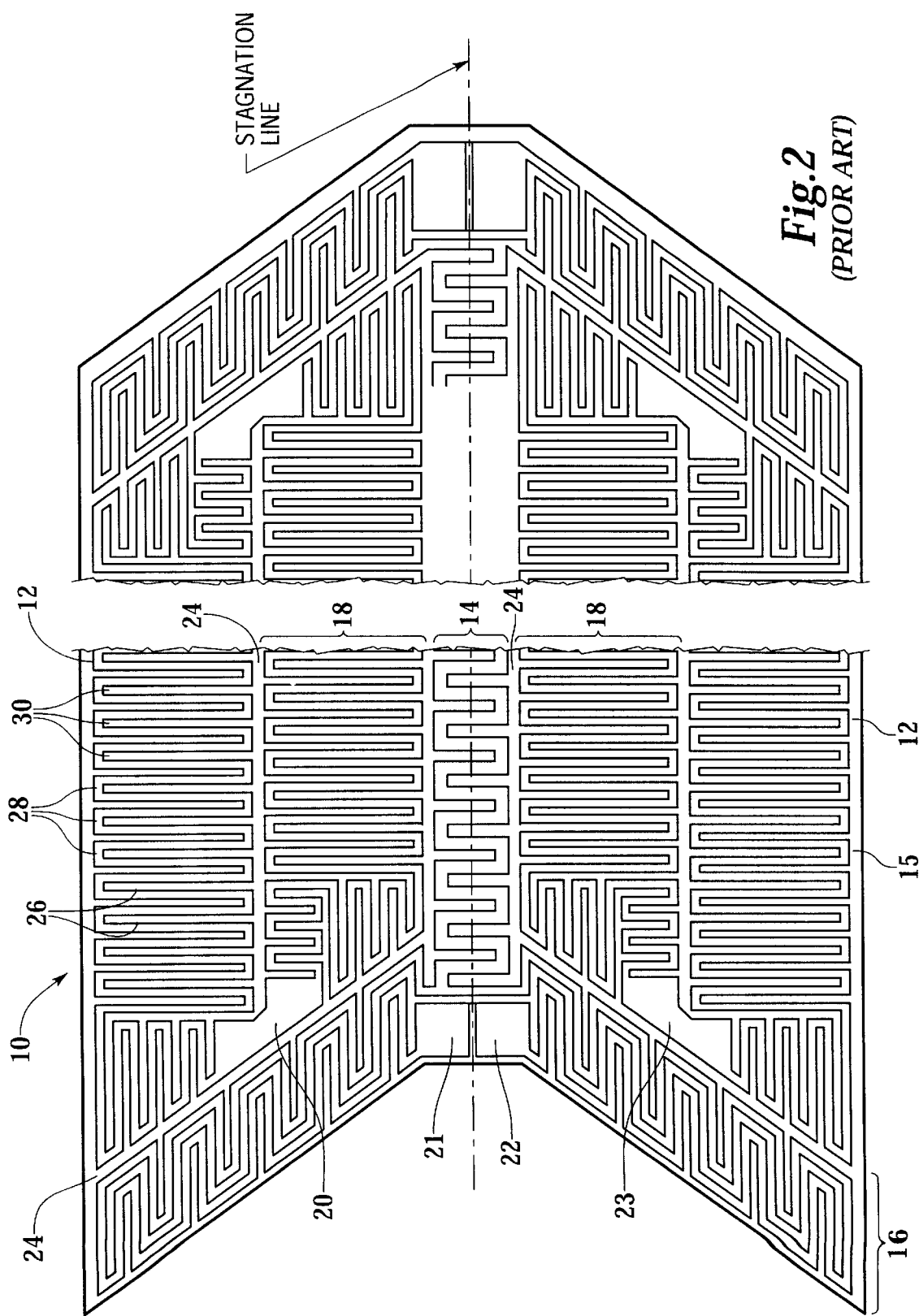
FIG. 2 is a top plan view of a prior art thermal de-icer.

FIG. 2 illustrates in further detail the prior art thermal de-icer 10 which includes a plurality of elements or ribbons 12. The elements 12 are typically mounted on a flexible backing 15. Then elements are arranged to provide a stepwise parting strip 14, chordwise parting strips 16, and stepwise shedding zones 18. Current is transmitted to the elements 12 by way of contacts 20–23. Contacts 20–23 include four pairs of contact pads, four of which pads are disposed on one end of the de-icer 10 and the other four of which are disposed on an opposing end of the de-icer 10. In operation, voltage differences are established between the pad pairs so that current flows through each of the elements 12.

Interheater gaps 24 are disposed between the various zones 14, 16 and 18. The elements 12 are defined by interconnected conductive segments 26, which conductive segments 26 are aligned along axes that are parallel with either the stagnation line or chordwise axes of the structural member 11. Each pair of conductive segments 26 is interconnected by a turn 28 and defines an inter-segmental gap 30.

In operation, current is transmitted continuously to the spanwise and chordwise parting strips 14, 16 so that heat is generated continuously therein. Heat is generated continuously in the spanwise parting strip 14 since ice that accumulates adjacent to the stagnation line, such as rime ice, tends to be most difficult to melt. Current is transmitted intermittently to the spanwise shedding zones 18 so that heat is generated intermittently therein.

One object of the de-icer 10 is to melt all of the ice that accumulates adjacent to the elements 12, but in practice certain problems arise. First, with heating or de-icing systems such as de-icer 10, ice can accumulate in the interheater gaps 24 as well as in the inter-segmental gaps 30. More specifically, during operation, very little current flows in the outer portions or corners of the turns 28 so that even when, for example, the turns 28 of one of the elements 12 are positioned close to the turns 28 of another of the elements 12, there still is no practical way to transfer heat from the one set of turns 28 to the other set of turns. Second, in common prior art arrangements of de-icer 10, no heat is supplied to contacts 20–23. In particular, the contact pads of contacts 20–23 are much wider than typical conductive segments 26 and are attached to a heavy lead wire having a relatively large cross-sectional area. Thus, the contact pads dissipate relatively little energy and become cold spots, upon which ice accumulates. Moreover, the contact pads serve as "anchors" for ice which would have melted but for the cold spots generated by the contacts 20–23. Third, the interheater gaps 24 between the chordwise parting strips 16 and the spanwise shedding zones 18 are particularly difficult to heat. More specifically, the outside corners of the turns 28 disposed near the chordwise parting strip 16 are angled to accommodate for chevron-shaped edges of the de-icer 10.

In operation, current does not flow efficiently in these angled corners and the resulting cold spot(s) can make the task of sufficiently heating the interheater gaps 24 even more difficult. Finally, some of the conductive segments 26 are too short in length to provide adequate heating. It has been found that when the conductive segments 26 are too short, current flux density is such that an undesirable heating pattern is achieved in the element 12.

It is believed that de-icer 10, while certainly more efficient than many known thermal de-icers, is incapable of minimizing cold spots. That is, even if cold spots could be eliminated in the interheater gaps 24 by generating more heat in the elements 12, the de-icer 10 still would consume undesirably high levels of power. Moreover, generation of more heat would not necessarily allow for melting in the region of the contacts 20–23 or in certain of the turns 28 formed near the chordwise parting strips 16.

Figure 4:
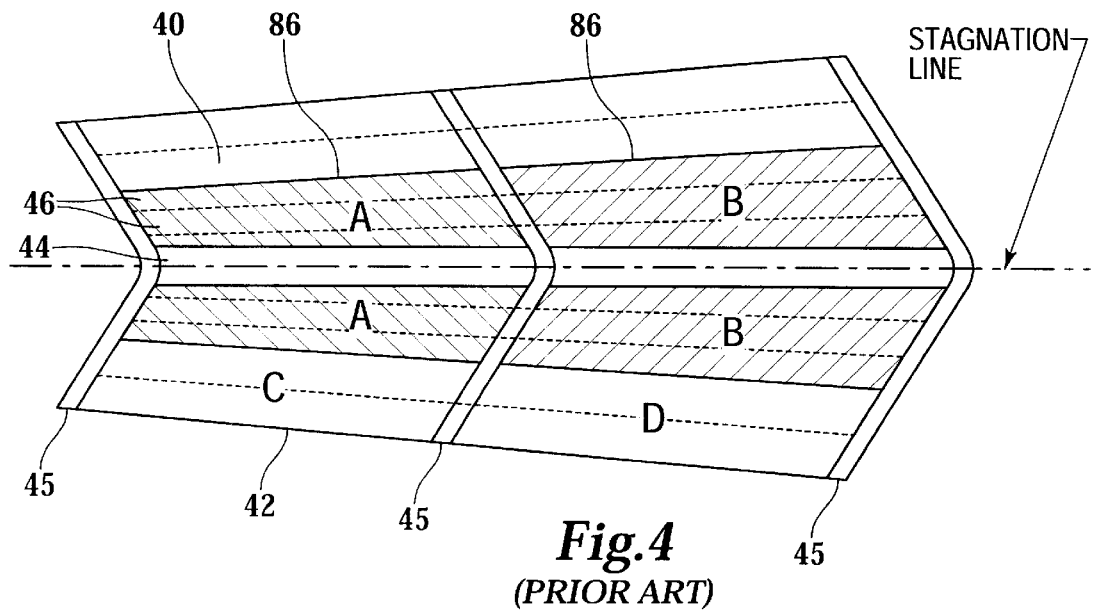
FIG. 4 is a vertical cross-sectional view of the layout for a prior art thermal de-icer taken along the stagnation line of FIG. 3.
Figure 3:
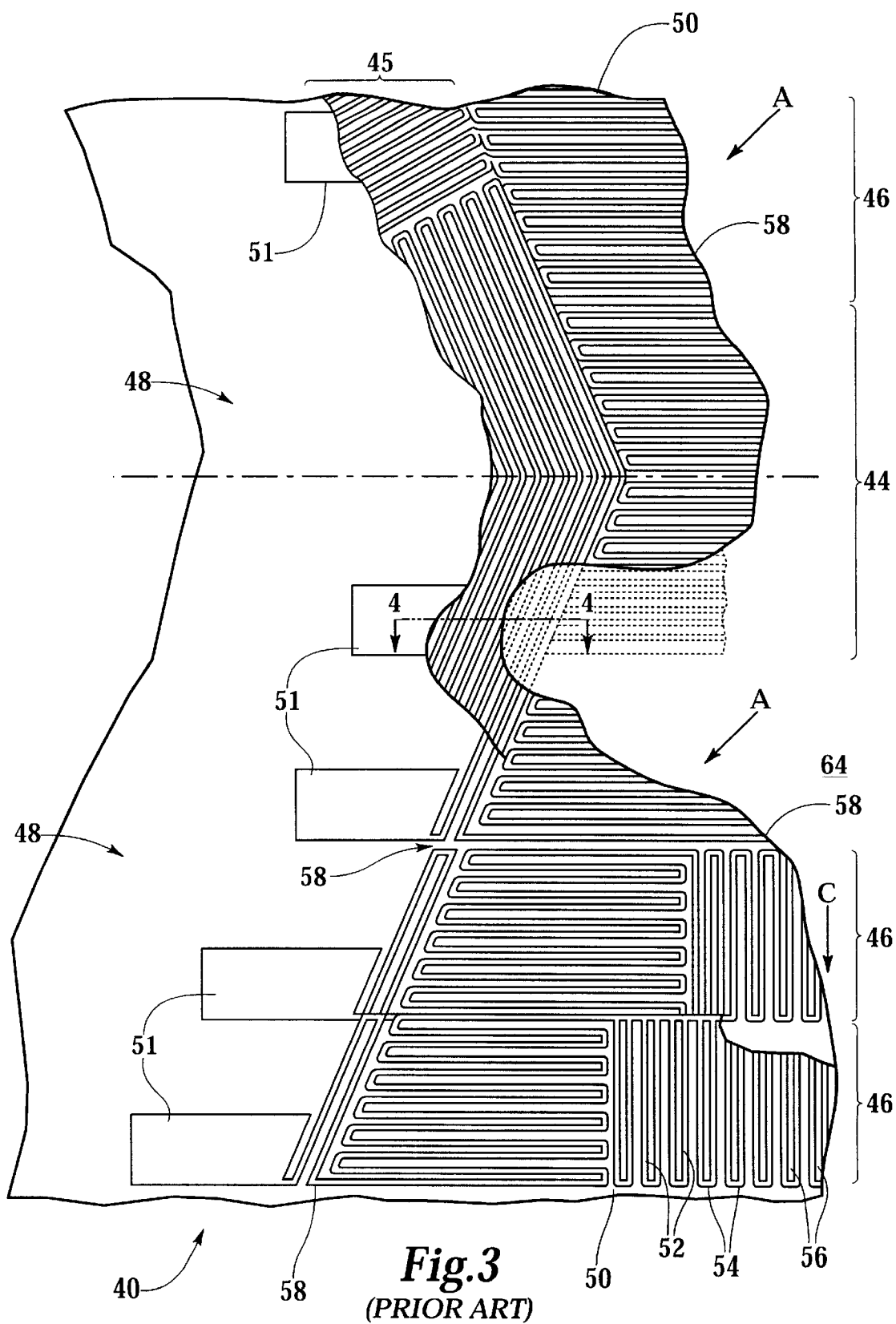
FIG. 3 is a partial, broken-away top plan view of a prior art thermal de-icer mounted on a structural member.

Referring to FIGS. 3 and 4, a partial plan view and perspective view, respectively, of a prior art thermal de-icing system is shown. The de-icer 40 provides heat to the interheater gaps 24 and the inter-segmental gaps 30 as well as to the contacts 20–23 (as shown in FIG. 2). The de-icer 40 is mounted along the leading edge 13 (FIG. 1) of the structural member 11. The structural member 11 is typically a composite material, but, in other examples, could be a metal, such as aluminum. Referring to FIG. 4, the de-icer system 40 may includes spanwise parting strips 44, chordwise parting strips 45 and spanwise shedding zones 46, each mounted on a flexible backing (not shown). The spanwise parting strip 44 preferably is mounted along an axis which is coincidental with a stagnation line most commonly encountered during icing conditions. The strips 44, 45 and the zones 46 include conductive elements or ribbons 50 which are positioned along either a spanwise or a chordwise axis. The elements 50 preferably are configured in serpentine patterns.

Referring to FIG. 3, current is transmitted to the elements 50 by way of contacts 51, which contacts 51 are connected to the elements 50. Contacts 51 include pairs of contact strips or pads, each of which strip is connected to an end of element 50 and includes a substantial portion disposed remotely of strips 44, 45 and zones 46. Only one contract strip is shown for each of the elements 50 in FIG. 3. It should be appreciated that such overlap eliminates cold spots which can exist in interheater gaps 50 during the heating of elements 50, and facilitates more desirable heat distribution between elements 50.

Cold spots, which can function as ice anchors, commonly form in the area covered by the contacts 51. Referring again to FIG. 3, local cold spots attributable to the contacts 51 are eliminated by overlapping the contacts 51 with the chordwise parting strip 45. Under one alternative technique for eliminating cold spots attributable to the contacts 51, the contacts 51 are folded under the elements 50 subsequent to mounting and etching of the elements 50 and contacts 51 on either of backings 47, 48. Under another alternative for eliminating cold spots, the contacts 51 are overlapped by a spanwise parting strip 44 or a spanwise shedding zone 46.

When the de-icer 40 is attached to an upper surface of structural member 11, lead wires are coupled to contacts 51. During installation lead wires are extended from the electrical system of the aircraft and through the leading edge 13 to the contact means 51. It also can be appreciated that chordwise parting strips 45 have contacts (not shown) which in one embodiment can be disposed under portions of the one or more spanwise parting strips 44.

Referring to FIGS. 5A–5B, therein is depicted cross-sectional views of a proprotor 100 as representative of one type of aircraft member utilizing the present invention wherein primary and secondary heating systems would be incorporated into its leading edge 102.

Proprotor blade 100 is constructed from a plurality of fiberglass skins such as fiberglass skin 104 and fiberglass skin 106 which form the aft body 108 shape of the blade 100. Surrounding the leading edge 102, blade 100 is covered by an abrasion strip assembly 110 that may be titanium or other suitable material and the heater blanket 112 which is bonded with adhesive to the blade spar 114. In addition, on the abrasion strip assembly 110, a nose cap 116 is positioned at the outermost edge of the leading edge 102. Disposed within rotor blade 100 at the leading edge of the spar 114 is an inertia weight 118.

As best seen in FIG. 5B, the abrasion strip assembly 110 is made up of the abrasion strip 120, nose cap 116 and the heater blanket 112. The heater blanket 112 is disposed between fiberglass layers 122, 124 and includes a fiberglass layer 126 therein. Disposed between the fiberglass layers 124 and the fiberglass layer 126 is the primary heating system 128. Disposed between the fiberglass layer 126 and the fiberglass layer 122 is the secondary heating system 130. The primary heating system 128 includes an anti-ice zone 132. The primary heating system 128 also includes a plurality of de-ice zones, such as a de-ice zone 134 positioning aft of the anti-ice zone 132 and on the upper surface of the abrasion strip assembly 110 and a de-ice zone 136 aft of the anti-ice zone 132 and on the lower surface of the abrasion strip assembly 110. Likewise, secondary heating system 130 includes an anti-ice zone 138 at the leading edge 102 of abrasion strip assembly 110 and a plurality of de-ice zones such as the de-ice zone 140 and the de-ice zone 142.

Figure 6A:
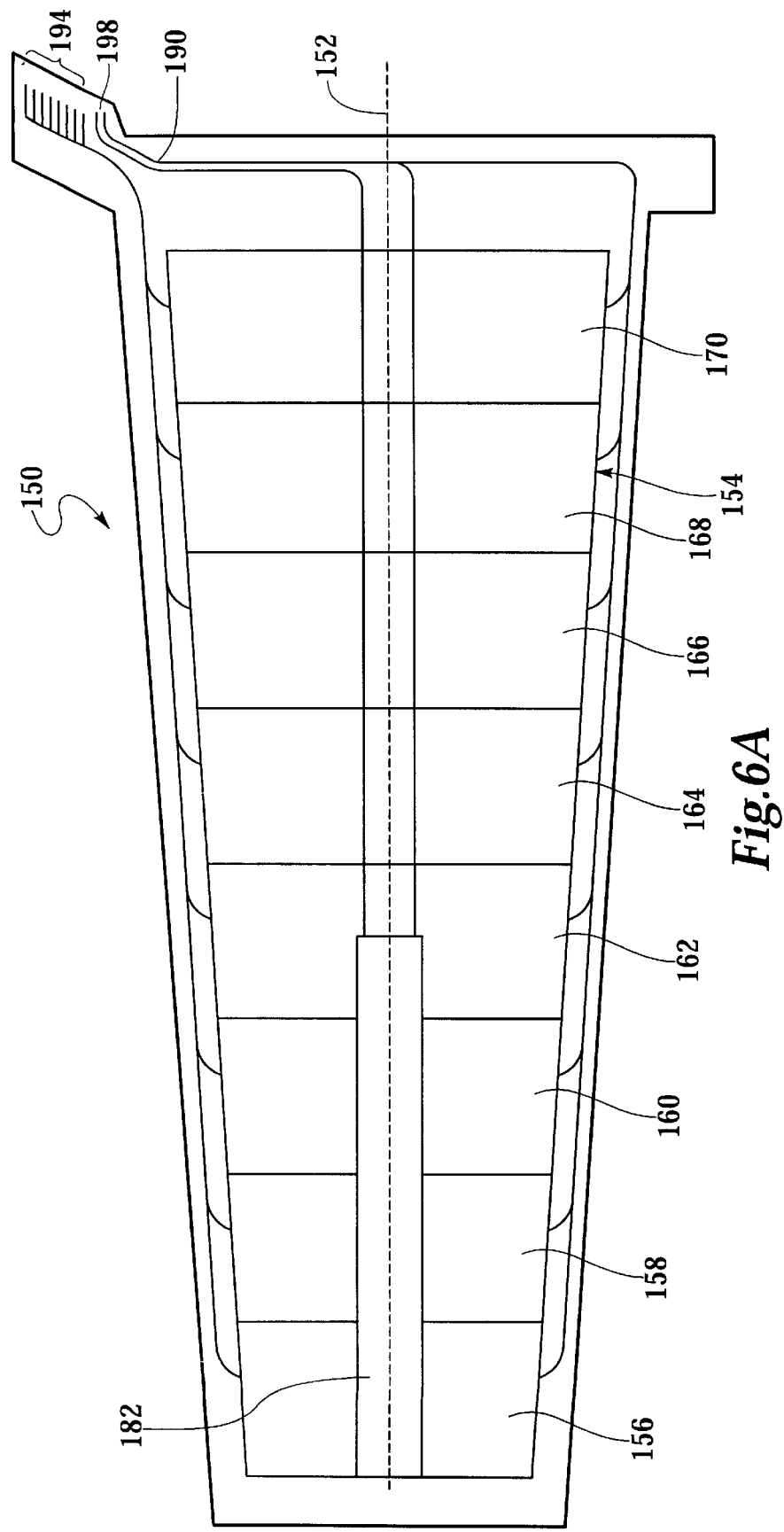

Referring to FIGS. 6A and 6B, therein are depicted spanwise schematic layouts of various layers of the proprotor proximate the leading edge. In FIG. 6A, proprotor section 150 has been unfolded about axis 152 which represents the leading edge of the proprotor such that the illustrated layer containing the primary heating system 154. The primary heating system 154 is divided into eight de-ice zones, specifically zones 156–170, starting at the tip of the proprotor section 150 and being of substantially equally-sized. The zones 156–170 cover the leading edge of the proprotor spanwise towards the inboard section of the proprotor 150. The secondary heating system 172 is depicted in FIG. 6B and has substantially overlapping coverage with the primary heating system 154. The secondary heating system 172 is divided into four generally equally spaced zones 174–180. It should be appreciated that neither the primary heating system 154 nor the secondary heating system 172 are restricted to the number of zones that may be implemented on an aircraft member.

Both the primary heating system 154 and the secondary heating system 172 have anti-ice zones 182, 184, respectively that are incorporated into a portion of the center of the leading edge of the proprotor section 150. The anti-ice zones are preferably incorporated from about half the span of the proprotor's span to the tip of the proprotor 150, and are less than an inch wide. The primary anti-ice zone 182 is on the very leading edge of the proprotor section 150. Underneath the primary anti-ice zone 182 is the secondary anti-ice zone 184, as best seen in FIG. 5.

The circuits for the primary heating system 154 and secondary heating systems 122 are completely separate. The primary anti-ice and de-ice systems share a common bus 190. The secondary anti-ice and de-ice systems share a common bus 192. The primary de-ice zones 156–170 are each provided electrical current via primary de-ice contacts and buses 194. The secondary de-ice zones 174–180 are each provided electrical current through their respective de-ice contacts and buses 196. The primary anti-ice zone is provided electrical current through contact/bus 198, and the secondary anti-ice zone is provided electrical current through contact/bus arrangement 200. A 3-phase power system is preferably used by the primary and secondary heating systems 154, 172. In order to provide absolute system redundancy, it is desirable to have separate primary and secondary power sources for the separate circuitry.

Referring to FIG. 7, a programable controller 210 manages the entire system. Power to the zones 156–170 of the primary heating system 154 and the zones 174–180 secondary heating system 172 are cycled by the controller 210. The secondary heating system 172 is invoked by the controller 210 when failure of the primary heating system 154 is sensed by sensors 212. The detection sensors 212 inform the controller 210 of a malfunction, a short, an open, or a change in the resistance of significant amount and it will shut that particular zone down. The controller 210 may cycle all the other primary de-ice zones. Alternatively, the controller 210 may completely by-pass the primary heating system 154 and invoke the full power of the secondary heating system 172.

A dedicated system controller 210 is best-suited for monitoring of sensors 212 and circuit management operations for the primary heating system 154 and secondary heating system 172. A dedicated controller 210 senses a problem, e.g., a short circuit in one of the zones, and can bypass the problem. The controller's zone cycling may be sophisticated depending on its programming. Sensing may also take into account, for example, depending on the severity of the ice condition, temperature and size of droplets (e.g., temperature, droplet size, number of droplets, formation of ice, speed of ice formation). The controller 210 will manage the duration that a particular zone is on based on the monitored conditions. Typically, a de-ice zone is not heated for more than 15 seconds. The controller 210 can be programmed to automatically manage the power systems for the aircraft. The controller 210 can be responsible for power conservation. Under normal circumstances, the secondary heating system 172 would only operate after failure of the primary heating system 154. The pilot, however, may be provided the option to override the heating controller functions as indicated at 214.

In the foregoing description, it will be readily appreciated by those skilled in the art that modifications may be made to the invention without departing from the concepts disclosed herein. Such modifications are to be considered as included in the following claims unless those claims, by their language, expressly state otherwise.

What is claimed is:

1. A redundant ice management system for an aircraft member, comprising:
   a primary ice management sub-system for providing thermal ice management to an area of the aircraft member; and
   a secondary ice management sub-system for providing back-up thermal ice management to the aircraft member in the event of a failure by the primary ice management sub-system, wherein the secondary ice management sub-system manages a majority of the area managed by the primary ice management sub-system.

2. The system of claim 1 wherein the primary and the secondary sub-systems are each further comprised of separate primary and secondary zones, respectively divided spanwise along the aircraft member to provide substantially overlapping coverage of the aircraft structural member.

3. The system of claim 2 wherein each of the primary and secondary zones further comprise electrical connection by separate electrical buses and contacts for independent control of each zone.

4. The system of claim 3 further comprising a controller for independently controlling each of the zones.

5. The system of claim 4 further comprising a monitoring system for monitoring each of the zones for operational readiness.

6. The system of claim 1 wherein the primary system is further comprised of an anti-ice element.

7. The system of claim 6 wherein the secondary sub-system is further comprised of a secondary anti-ice element.

8. The system of claim 7 wherein a controller controls the activation of the primary and the secondary anti-ice elements.

9. The system of claim 1 wherein the primary sub-system further comprises a plurality of primary de-ice sections, the primary de-ice sections providing thermal zones for providing thermal ice management across the aircraft member.

10. The system of claim 9 wherein the secondary system further comprises a plurality of secondary de-ice sections, the secondary de-ice sections for providing back-up thermal zones for providing overlapping thermal ice management to the aircraft member in the event of a failure by the primary de-ice sections.

11. The system of claim 9 wherein the primary system is further comprised of an anti-ice element.

12. The system of claim 10 wherein the secondary sub-system is further comprised of a secondary anti-ice element.

13. The system of claim 9, further comprising a controller and monitor for controlling and monitoring the operation and functionality of the primary and secondary sub-systems.

14. A redundant ice management system for an aircraft member, comprising:

a primary ice management sub-system for providing thermal ice management to an area of the aircraft member;

a secondary ice management sub-system for providing back-up thermal ice management to the aircraft member in the event of a failure by the primary ice management sub-system, wherein the secondary ice management sub-system manages a majority of the area managed by the primary ice management sub-system; and a controller for independently controlling the primary and secondary ice management sub-systems.

15. The invention of claim 14, further comprising a monitor for monitoring atmospheric conditions and the aircraft member for indications of ice forming on the aircraft members.

16. The system of claim 14 wherein the primary and the secondary sub-systems are each further comprised of separate primary and secondary zones, respectively divided spanwise along the aircraft member to provide substantially overlapping coverage of the aircraft member.

17. The system of claim 16 wherein each of the primary and secondary zones further comprise electrical connection by separate electrical buses and contacts for independent control of each zone by the controller.

18. A method for managing the formation of ice on an area of an aircraft member with an ice management system comprising primary and secondary ice management sub-systems, the method comprising:

monitoring the aircraft member and atmospheric conditions for ice formation conditions on the aircraft member;

activating the primary ice management system in response to an indication of ice formation on the aircraft member;

monitoring the primary ice management system to determine its operational readiness and efficiency; and activating the secondary ice management system in response to the monitoring of the primary ice management system if the primary ice management system fails operational readiness and efficiency requirements, wherein the secondary ice management sub-system manages a majority of the area managed by the primary ice management sub-system.

19. The method of claim 18, further comprising monitoring the secondary system to determine its operational readiness and efficiency and reactivating the primary ice management system if the secondary ice management system fails operational readiness and efficiency requirements.

20. The method of claim 19 wherein the primary and secondary systems are monitored and managed by a controller.

21. The method of claim 20 wherein the primary and the secondary ice management systems are further comprised of multiple zones situated along the aircraft member, the secondary system providing substantially overlapping coverage with the primary system, and the controller independently manages each of the zones.

22. The method of claim 21 wherein the controller cyclically activates each of the zones in response to the monitoring of aircrafts structural members and the primary and secondary systems.

* * * * *